United States Patent [19]

Nagashima et al.

[11] Patent Number: 4,608,682
[45] Date of Patent: Aug. 26, 1986

[54] OPTICAL TIME-DIVISION SWITCHING SYSTEM EMPLOYING OPTICAL BISTABLE DEVICES

[75] Inventors: Kunio Nagashima; Michikazu Kondo, both of Tokyo, Japan

[73] Assignee: NEC Corporation, Tokyo, Japan

[21] Appl. No.: 555,927

[22] Filed: Nov. 29, 1983

[30] Foreign Application Priority Data

Nov. 29, 1982 [JP] Japan ............................. 57-208873
Dec. 10, 1982 [JP] Japan ............................. 57-216708

[51] Int. Cl.$^4$ .......................... H04B 9/00; H04J 3/00
[52] U.S. Cl. ................................. 370/4; 350/96.14
[58] Field of Search .............. 370/4; 350/96.13, 96.14; 455/600

[56] References Cited

U.S. PATENT DOCUMENTS

| | | | |
|---|---|---|---|
| 3,604,936 | 9/1971 | Kompfner | 370/4 |
| 3,849,604 | 11/1974 | Benes et al. | 370/68 |
| 4,323,984 | 4/1982 | Ishihara et al. | 350/377 |
| 4,467,471 | 8/1984 | Troost | 370/68 |
| 4,483,004 | 11/1984 | Inaba et al. | 357/19 |

OTHER PUBLICATIONS

Cross, P. S. et al., "Optically Controlled Two Channel Integrated-Optical Switch", *IEEE Journal of Quantum Electronics*, vol. QE-14, No. 8, Aug. 1978, pp. 577-580.

Primary Examiner—Joseph A. Orsino, Jr.
Attorney, Agent, or Firm—Sughrue, Mion, Zinn, Macpeak, and Seas

[57] ABSTRACT

In an optical time-division switching system, time-division multiplexed calling and called station signals are arranged in incoming time slots and applied through an incoming common optical medium to a first optical switching circuit that switches the signals to optical bistable devices in which the signals are stored as binary 1's or 0's. A second optical switching circuit is coupled to the bistable devices for reading the stored calling station signal in the time slot of the called station and reading the stored called station signal in the time slot of the calling station to rearrange the signals in outgoing time slots. The signals in the outgoing time slots are applied through an outgoing common optical medium to a time-division demultiplexer which sequentially distributes the signals to the calling and called stations.

6 Claims, 16 Drawing Figures

| i<br>Pin | io | ib |
|---|---|---|
| 0 | RESET | HOLD |
| Pt | P₂ | SET |

OPTICAL TIME-DIVISION SWITCHING SYSTEM EMPLOYING OPTICAL BISTABLE DEVICES

BACKGROUND OF THE INVENTION

The present invention relates to an optical time-division switching system.

Since the introduction of optical fibers various attempts have been made to develop optical telecommunications systems having a high speed and large traffic handling capacity. In particular, optical time division digital transmission systems are the most attractive system for future applications. However, the current switching system handles electrical signals; conversion of electrical to optical energy or vice versa is necessary at every junction between optical transmission systems and electrical switching systems. Another disadvantage resides in the fact that while optical transmission systems are capable of transmitting signals at speeds higher than 100 megabits per second, electrical time-division switching systems are not capable of switching at comparable speeds.

To overcome these disadvantages efforts have been made to develop optical switching systems. An optical switching system, shown and described in Japanese Patent Laid-open Publication No. 53-117311, employs optical waveguides of different lengths as delay lines to which optical signals of different time slots are selectively applied through an optical switch to effect the switching of the signals from one time slot to another. Since the maximum delay time is exclusively determined by the length of the waveguides, the prior art system has not sufficient flexibility to accommodate a varying number of customer stations and facilities from one switching office to another. Furthermore, waveguides of substantial length would be required to handle signals of a long frame length, resulting in a large equipment size. Another disadvantage of this system is that a switching loss tends to occur at the connection between the optical switch and the delay lines.

SUMMARY OF THE INVENTION

The present invention has for its object the provision of a time-division optical switching system which gives flexibility to the design of frame length and allows compact equipment, and ensures a high level of optical output.

The present invention accomplishes this object by the use of optical bistable devices for storing signals of different time slots to allow them to be retrieved at times determined by dialed information.

The switching system of the invention includes means for time-division multiplexing signals from a plurality of stations and applying the multiplexed signals to a common incoming optical medium, or waveguide and means for demultiplexing time-division multiplexed signals from a common outgoing optical medium and applying the demultiplexed signals to the stations. The system is characterized by the inclusion of first means for selectively switching the multiplexed signals from the common incoming optical medium to the optical bistable devices to individually store the signals therein, and second means for selectively switching the stored signals from the bistable devices to the outgoing optical medium.

The frame length can thus be determined by the number of such bistable devices and the period of each time slot in which writing and reading operation is effected.

Optical devices having a hysteresis characteristic can be employed for storing optical binary signals. A bistable laser diode is available for such purposes. An injection current is applied from an external source to the laser diode to keep it excited to hold an optical binary signal. An optical circuit having a feedback loop is also avaiable for storing an optical binary signal. This type of circuit needs an external light source to keep it in a predetermined binary state.

BRIEF DESCRIPTION OF THE DRAWINGS

The present invention will be described in further detail with reference to the accompanying drawings, in which.

DETAILED DESCRIPTION

Figure 1:
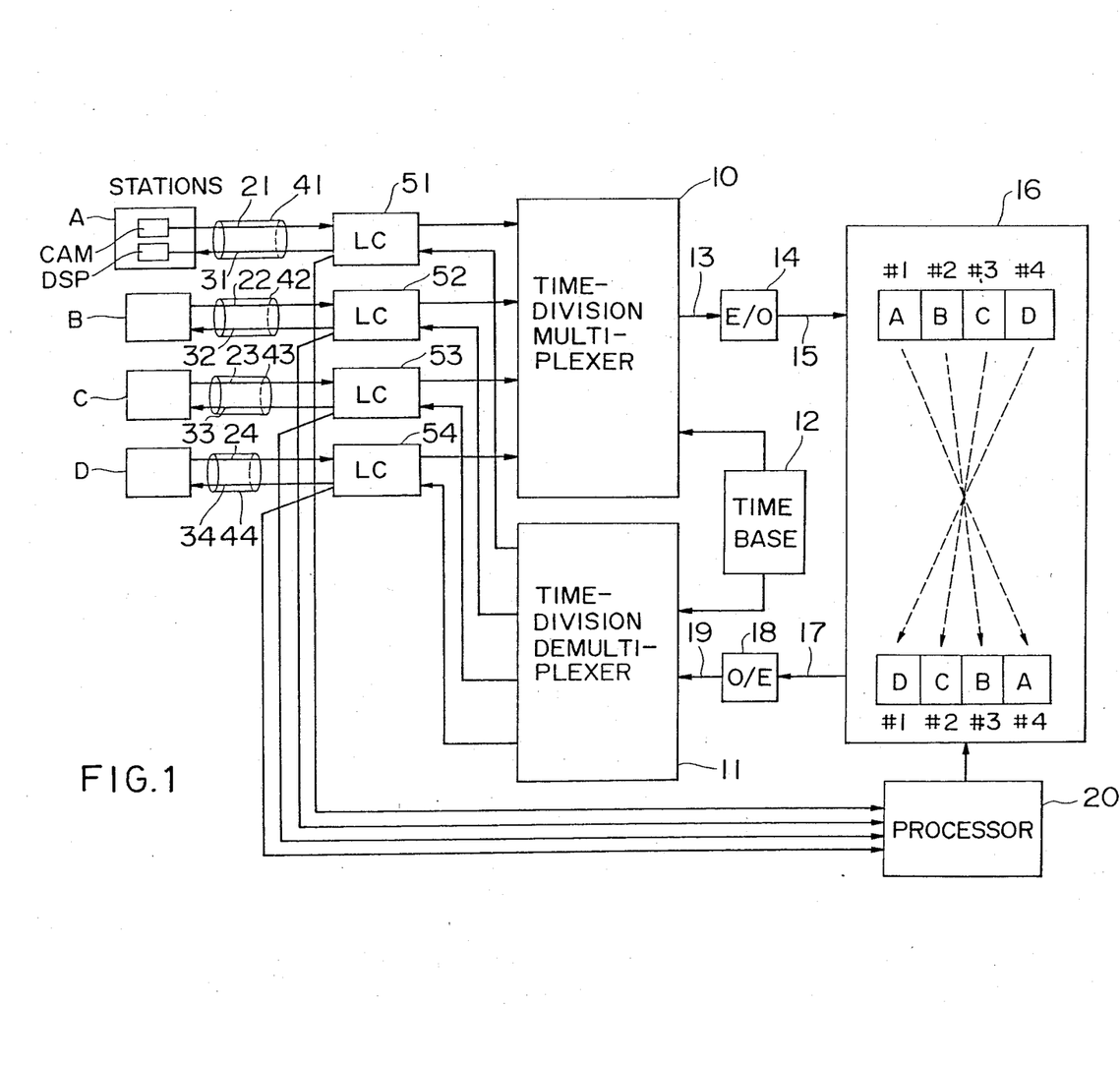
FIG. 1 is a schematic block diagram of an optical time-division switching system embodying the present invention.

Referring now to the drawings in which corresponding parts are indicated by the same reference numerals throughout. In the embodiment of FIG. 1, an optical time-division switching system is schematically illustrated as comprising a multiplexer 10 and a demultiplexer 11 which are synchronized with a clock supplied from a clock generator 12.

For purposes of illustration, four channels 21, 22, 23 and 24 are shown as incoming channels and four channels 31, 32, 33, 34 are shown as outgoing channels. The incoming 21-24 and outgoing channels 31-34 are carried via coaxial cable pairs 41-44 between stations A, B, C and D and line circuits 51-54, respectively. The line circuits 51-54 are of the well known type which serves as an interface between the coaxial cables 41-44 and a multiplexer 10 and a demultiplexer 11 as well as a unit for generating a signal indicating the presence of a request for service from the customers.

Each station is shown as a video telephone set including a video camera CAM and a display unit DSP respectively connected to the incoming and outgoing channels of the associated line circuit. The multiplexer 10 is of the type known in the time-division switching art which sequentially couples individual customer stations to a common outgoing channel 13, so that the signals from stations A to D are arranged in a recyclic sequence of #1 to #4 incoming time slots.

Connected to the outgoing channel 13 is an electro-optical converter 14 which converts the time-division multiplexed electrical signal to a corresponding optical signal for delivery via a common optical waveguide 15 to an input terminal of a switching network 16 constructed according to the present invention. The switching network 16 has an output terminal which is coupled via a common optical waveguide 17 to an opto-electrical converter 18 which converts the optical signal into a corresponding electrical signal for application to an incoming channel 19 of the time-division demultiplexer 11. The demultiplexer 11 sequentially distributes the signals of the outgoing time slots #1 to #4 of the switching network 16 to the line circuits 51-54.

As will be described, the switching network 16 includes an array of optical bistable devices which are provided in one-to-one correspondence with the customer stations. In the optical bistable devices are sequentially stored the multiplexed signals in response to write instructions from a processor 20. The stored signals are read in response to readout instructions from the processor. The processor 20 is of the type known in the time-division switching art and may include a scanner for scanning the line circuits 51-54 to detect the presence of a request for service and interprets dialed information to determine the time slots of the calling and called stations. From the time slot numbers of the calling and called stations the processor 20 derives a first read instruction for enabling the switching network 16 to read the stored calling station signal in the time slot of the called station and a second read instruction for enabling it to read the stored called station signal in the time slot of the calling station.

Figure 2:
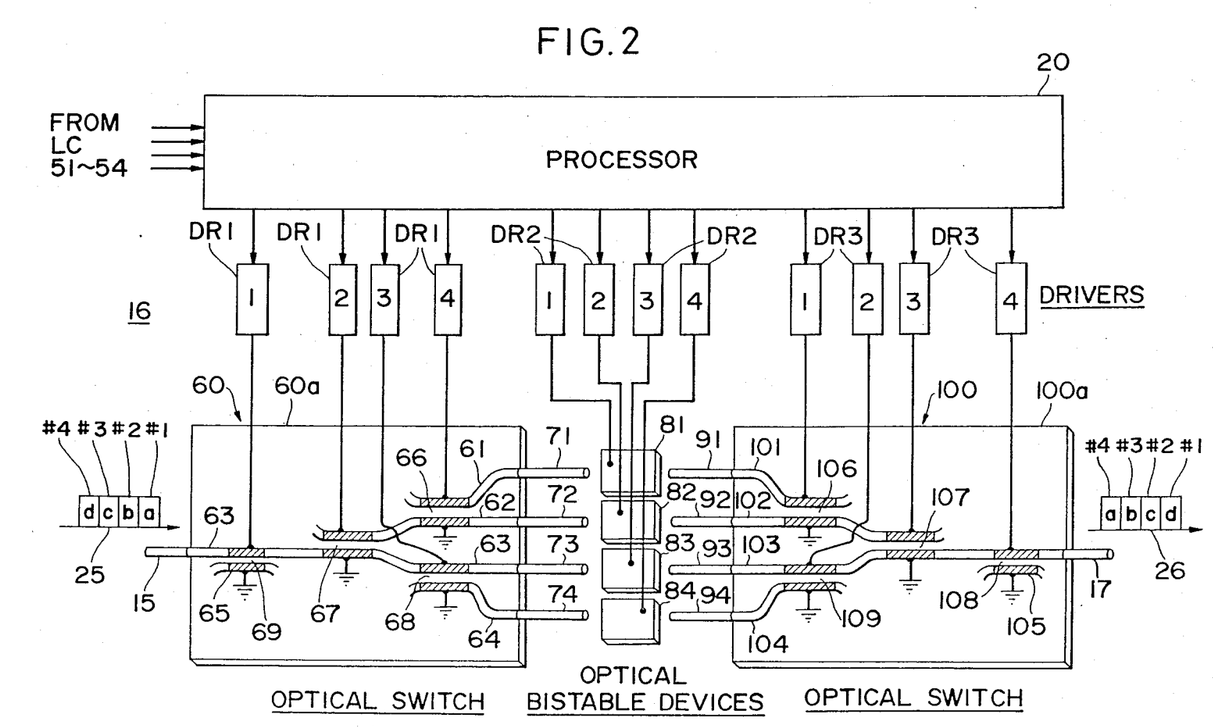
FIG. 2 is a diagrammatic view illustrating a first embodiment of the switching unit of FIG. 1 employing laser diodes as bistable devices.

Details of the switching network 16 are illustrated in FIG. 2. The time-division multiplexed optical signal supplied from the multiplexer 10 comprises an optical stream 25 of digital signals a, b, c, d corresponding respectively to the stations A to D arranged in incoming time slots #1 to #4. For the purpose of illustration, it is assumed that each digital signal comprises a binary 1 or 0. The switching network 16 comprises a write-in optical switch 60 which sequentially writes the optical digital signals a, b, c, d into optical bistable devices 81-84 respectively in response to write-in voltage pulses from drivers DR1. The switching network 16 further includes a read-out optical switch 100 which is identical in structure to the write-in optical switch 60 and is responsive to readout voltage pulses supplied from drivers DR3 to selectively read the stored digital signals a, b, c, d out of the optical bistable devices 81-84 in accordance with dialed information.

The write-in optical switch 60 comprises a lithium niobate substrate 66 on which is diffused a pattern of titanium to form four optical waveguides 61, 62, 63, 64 which are coupled via optical waveguides 71, 72, 73, 74 to optical bistable devices 81, 82, 83, 84, respectively.

The waveguide 63 is coupled at the input end to the common optical waveguide 15 and is in close proximity to the waveguide 62 at a point 67 where directional coupling, or switching occurs. The waveguide 62 is in close proximity to the waveguide 61 at a point 66 where switching occurs. The waveguide 63 is further in close proximity to the waveguide 64 at a point 68 where switching occurs. The switching points 66-68 are provided with first and second electrodes in pairs, the first electrodes being coupled to drivers DR1-2 to DR1-4, respectively, and the second electrodes being grounded.

By sequential application of a write-in voltage pulse to the electrodes of the switching points 66, 67, 68, the waveguide 15 is coupled sequentially to the bistable devices 81-84 via waveguides 71-74. The signal on the waveguide 15 is further controlled by an additional switching point 69 which is formed by a portion of the waveguide 63 provided with an electrode which is coupled to the driver DR1-1 and an adjacent waveguide 65 on which a grounded electrode is provided.

Figure 3A:
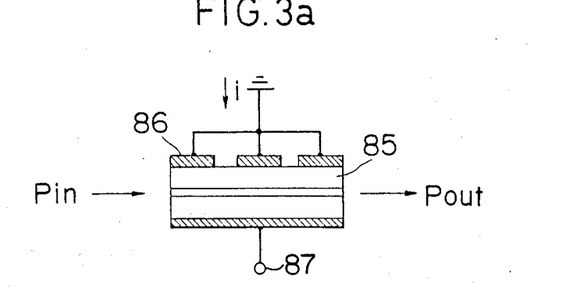
FIG. 3a is a schematic illustration of the laser diode of FIG. 2, and FIGS. 3b to 3d show operating characteristics of the laser diode.

Each of the optical bistable devices 81-84 comprises a bistable laser as shown in FIG. 3a. This laser comprises a current-injection type semiconductor 85 formed of GALaAs/GaAs or InGaAsP/InP in a double heterojunction structure having an electrode 86 coupled to a current injection terminal 87. The electrode has such a nonuniform pattern that it creates a region in which no current is injected. Such a region acts as a saturable absorber in the laser so that with the optical input being zero the output of the laser exhibits marked hysteresis characteristic as shown in FIG. 3b.

Figure 3B:
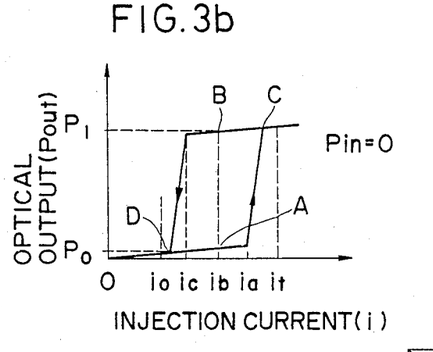
Figure 3C:
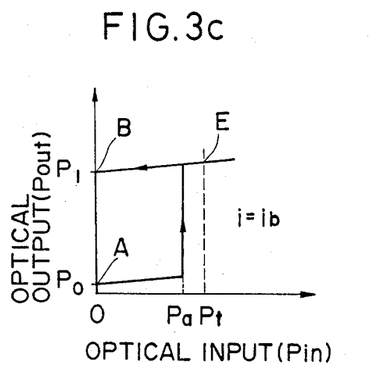

In FIG. 3b, the optical output of the bistable laser is plotted as a function of the injected current. As shown the laser output increases sharply to a saturation point C when the injection current has increased from $i_o$ to $i_t$ and sharply drops when the current has decreased to $i_o$ and thus finds stability at points A and B corresponding to levels P0 and P1, respectively. FIG. 3c is a plot of the device's output as a function of the optical input with the injection current being maintained at $i_b$. When the optical input is zero the output stabilizes at point A and as it increases to Pa, the output sharply increases until a saturation point E is reached. As the input has decreased to zero the output shifts to the stability point B. Therefore, the laser stabilizes at point A or B when the optical input is zero.

Figure 3D:
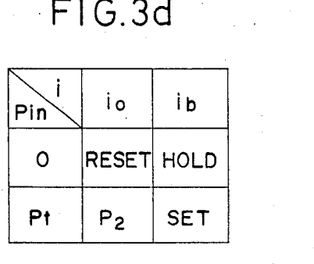

From FIGS. 3b and 3c a truth table shown in FIG. 3d can be derived. The truth table shows that when the injection current is $i_b$ and the optical input is zero, the bistable laser 81 retains the previous state and when the device is stabilized at point B, FIG. 3b, a brief reduction of the injection current from $i_b$ to $i_o$ causes the output to shift from point B through point D to the point A where it stabilizes, thereby resetting the laser. If the laser is stabilized at point A, FIG. 3c, a brief increase in the optical input from zero to a level Pt which is higher than Pa will cause the output to follow the path from point A through point E to the stability point B which indicates that the bistable laser is triggered into a set condition. Assume further that the injection current is $i_o$ and the optical input is Pt, the laser output will assume a value P2 which depends on the operating characteristic of the device. However, this laser output level is not utilized in the present invention. A further discussion on the bistable optical laser is found in an Article "Bistable Operation of Semiconductor Lasers By Optical Injection" by H. Kawaguchi, Electronics Letters, Oct. 1, 1981, Vol. 17, No. 20, pages 741-742.

Therefore, by switching the injection current to zero in response to a given command signal from the processor, the stored binary data can be erased and by controlling the optical switch 60 in response to a second command signal from the processor 20 an optical binary data is written from a selected one of the waveguides 71-74 into the associated optical bistable device.

Figure 4:
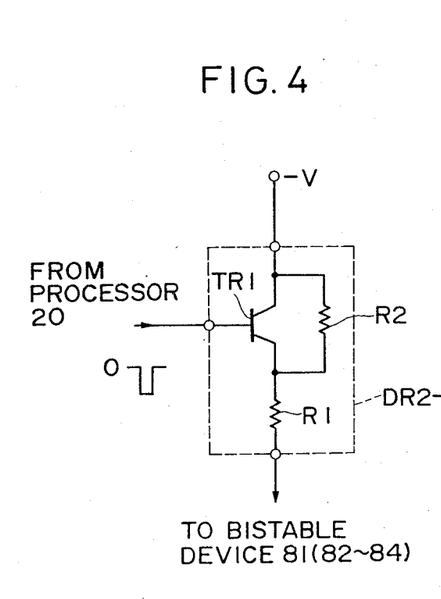
FIGS. 4 and 5 are circuit diagrams of drivers employed in the embodiments of the present invention.

FIGS. 4 and 5 are illustrations of examples of the drivers DR1, DR2 and DR3. In FIG. 4, the driver DR2 comprises an n-p-n transistor TR1 having its base coupled to be responsive to a command signal from the processor 20 and its emitter coupled to a negative voltage source $-V$ and its collector coupled in series with a resistor R1 to an associated one of the optical bistable devices 81-84. The emitter-collector path of the transistor TR1 is in shunt with a second resistor R2. The transistor TR1 is normally remains conductive to generate a higher injection current i which is given by $V/(R_1+r_1+r_2)$, where $r_1$ and $r_2$ are the internal resistances of the optical bistable device and the transistor TR1, respectively, and where $r_2$ is much smaller than $R_2$. In response to a negative-going pulse from the processor 20, the transistor TR1 is turned off so that the injection current i is reduced to a lower value given by $V/(R_1+R_2+r_1)$.

Figure 5:
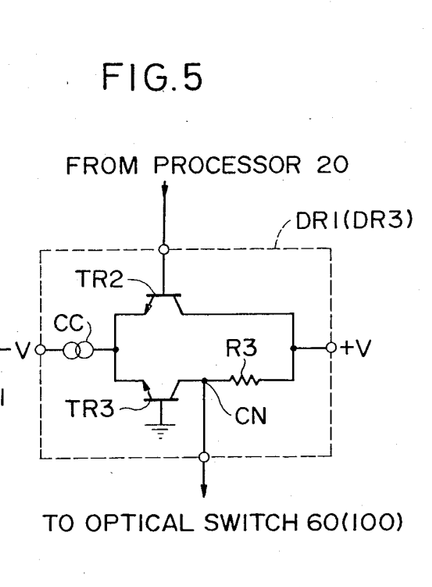

In FIG. 5, the driver used to drive the optical switches 60 and 100 comprises a pair of transistors TR2 and TR3 having their emitters coupled together to a constant current source CC which in turn connected to the negative voltage supply $-V$ and their collectors coupled to a positive voltage supply $+V$ with a resistor R3 being connected in the collector circuit of transistor TR3. The base of transistor TR2 is connected to the processor 20 and that of transistor TR3 is connected to ground. A circuit node CN between the collector of transistor TR3 and resistor R3 is coupled to an associated one of the directional couplers of the optical switch 60 or 100. The voltage developed at the node CN varies between zero voltage level and a positive voltage $V_1$ in response to a command signal applied to the base of transistor TR2.

The operation of the switching network 16 of FIG. 2 will now be described with reference to a timing diagram shown in FIG. 6. It is assumed that the train of digital signals 25 is a series of NRZ (non-return-to-zero) binary 1's and 0's of the stations A, B, C, D which are designated as a, b, c, d and assigned to incoming time slots #1 to #4 for purposes of illustration. An optical input having the level of Pt represents a binary 1 and an optical input having a zero level represents a binary 0, as indicated by the train of optical pulses 25 in FIG. 6. A binary 1 is written into any one of optical bistable devices 81-84 when the latter is injected from the associated one of the write-in waveguides 71-74 with a light input having the level Pt upon coincidence with a current drop in the injection current i from the level $i_b$ to the level $i_o$ that occurs in the first half period of each time slot. A binary 0 is written into the optical bistable devices in response to there being a simultaneous presence of a zero light input and the occurrence of the injection current drop from $i_b$ to $i_o$. The injection-current control transistor TR1 of each current driver DR2 normally remains conductive to supply an injection current $i_b$ (FIG. 3b) to each of the optical bistable lasers 81-84. Thus, the transistor TR1 associated with the optical bistable device into which an information bit is to be stored is turned off by a write-in pulse supplied from the processor 20.

The voltage driver DR1-1 is normally activated to supply a voltage $V_1$ to the directional coupler 69 to optically isolate the write-in waveguides 71-74 from the incoming waveguide 15. Likewise, the voltage driver DR3-4 is normally activated by the processor 20 to apply voltage $V_1$ to the directional coupler 108 of the optical switch 100 to isolate the read-out waveguides 91-94 from the outgoing waveguide 17.

For purposes of illustration it is assumed that a connection is to be established between stations A and D and between stations B and C. This is achieved by interchanging the binary information of stations A and D between the #1 and #4 time slots. Likewise, the binary information of stations B and C are interchanged between the #2 and #3 time slots. The description is only concerned with transposing the station A information from the #1 time slot to the #4 time slot for the purpose of simplicity.

When the processor 20 detects the presence of a service request from the station A, the processor then operates on dialed information subsequently received from it and interprets that the station D is being called and issues an injection current control pulse having a duration one half the period of the time slot to the current driver DR2-1 at the beginning of the #1 time slot. The driver DR2-1 responds to it by reducing the injection current from the level $i_b$ to the level $i_o$ during the first half period of the #1 time slot as illustrated in FIG. 6. Upon the lowering of the injection current to $i_o$ the bistable device 81 is reset to an optical output level $P_0$ according to the truth table, FIG. 3d.

Immediately following the trailing edge of the control pulse supplied to the driver DR2-1, a write instruction is given in the form of a negative-going pulse having a duration one-half the period of time slot to the voltage driver DR1-1 to turn it off and a positive-going pulse of the same duration to drivers DR1-2 and DR1-4 to turn them on. Driver DR1-1 removes the switching potential from the directional coupler 69 to allow the optical input Pt of station A on waveguide 15 to pass therethrough to the directional coupler 67. Drivers DR1-2 and DR1-4 apply a switching potential $V_1$ to the directional couplers 67 and 66 as shown in FIG. 6, whereby the incoming signal is switched by directional couplers 67 and 66 to waveguide 71, thence to the bistable device 81. The injection of the optical input Pt to the device 81 thus coincides with the injection of current $i_b$ thereto from the driver DR2-1. From the truth table, it is seen that the device 81 is triggered into a set condition, increasing its laser output from the level $P_0$ to $P_1$ and holding the level P1 until the injection current drops to $i_o$ in the #1 time slot of the next frame, as shown in FIG. 6. Therefore, a binary 1 is stored in the device 81 for the entire duration of the #1 to #4 time slots to be read out by the readout optical switch 100.

In like manner digital signals of stations B, C and D are subsequently written into the bistable devices 82, 83 and 84, respectively.

A reading operation is then effected on the bistable device 81 in response to a read instruction given by the processor 20 during the #4 time slot to the voltage drivers DR3-1, DR3-3 and DR3-4 in the form of a pulse having the duration of time slot so that driver DR3-4 removes the switching potential from the directional coupler 108 establishing an optical path to the outgoing waveguide 17 and drivers DR3-1 and DR3-3 provide a switching potential $V_1$ to the directional couplers 106, 107, establishing an optical path from the output of bistable device 81 through waveguide 91, directional couplers 106, 107, 108 to the outgoing optical waveguide 17. Therefore, the binary 1's and 0's of the station A now appear in the #4 time slot of the called station D.

In like manner, the station D signal is switched to the #1 time slot to which the calling station A is assigned by having the processor 20 programmed to generate a read instruction whereby the information stored in the bistable device 84 is read in the #1 time slot. Likewise, the station B signal is switched to the #3 time slot by reading the bistable device 82 in the #3 time slot to which the station C is assigned, and the station C signal is switched to the #2 time slot to which the station B is assigned by reading the bistable device 83 in the #2 time slot. As a result, the binary signals of stations A, B, C, D are arranged in the order of D, C, B, A in the outgoing time slots as shown in FIG. 6 and applied to the optoelectrical converter 18, FIG. 1, and thence to the demultiplexer 11 which sequentially distributes the digital samples d, c, b, a to the line circuits 51, 52, 53, 54, respectively, thereby establishing a connection between stations A and D and a connection between stations B and C.

Figure 6:
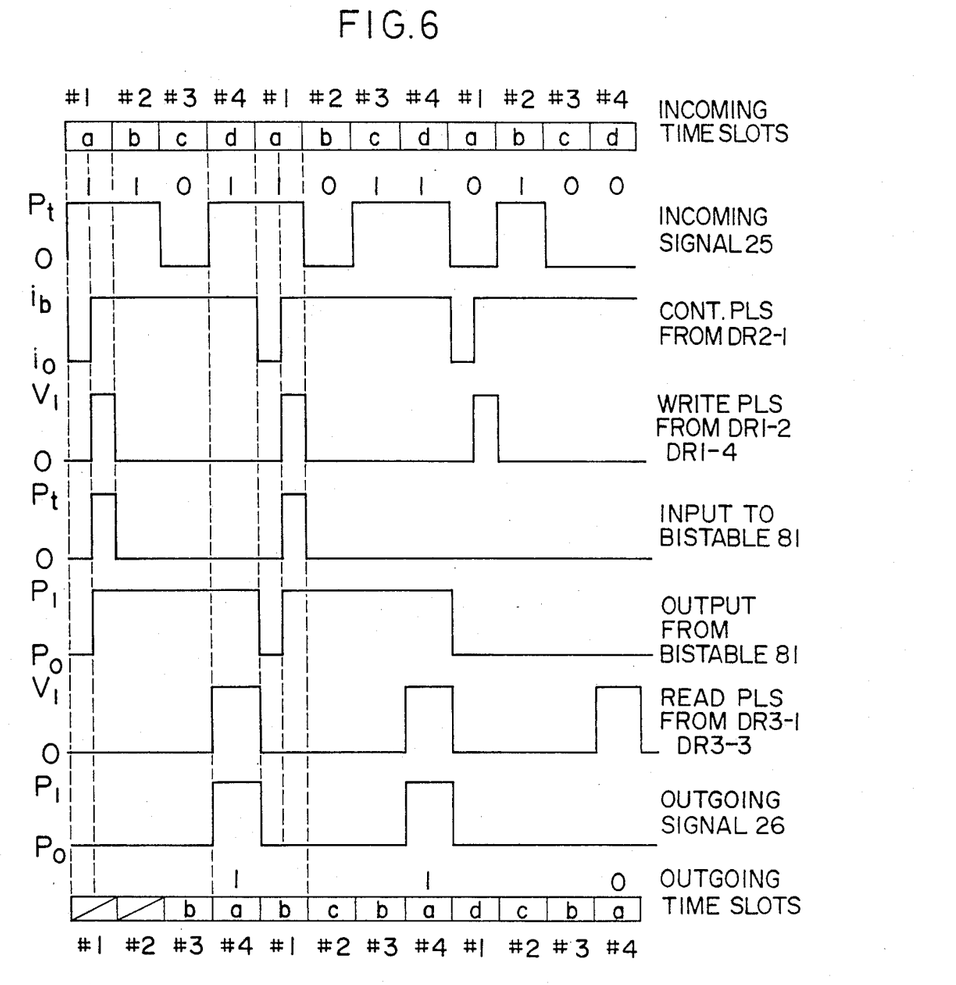
FIGS. 6 and 7 are timing diagrams useful for describing the operation of the FIG. 2 embodiment.

In the timing diagram of FIG. 6, the injection current $i_o$ occurs at times exclusively with times in which the optical input Pt occurs so that the set condition of the truth table, FIG. 3d, is met. The switching network 16 of the invention may be operated in a manner that allows $i_o$ and Pt to occur simultaneously so that the optical bistable devices momentarily assume the indefinite value $P_2$. However, this condition is immediately followed by a situation in which Pt and $I_b$ occur simultaneously so that the definite value $P_1$ can be taken.

Figure 7:
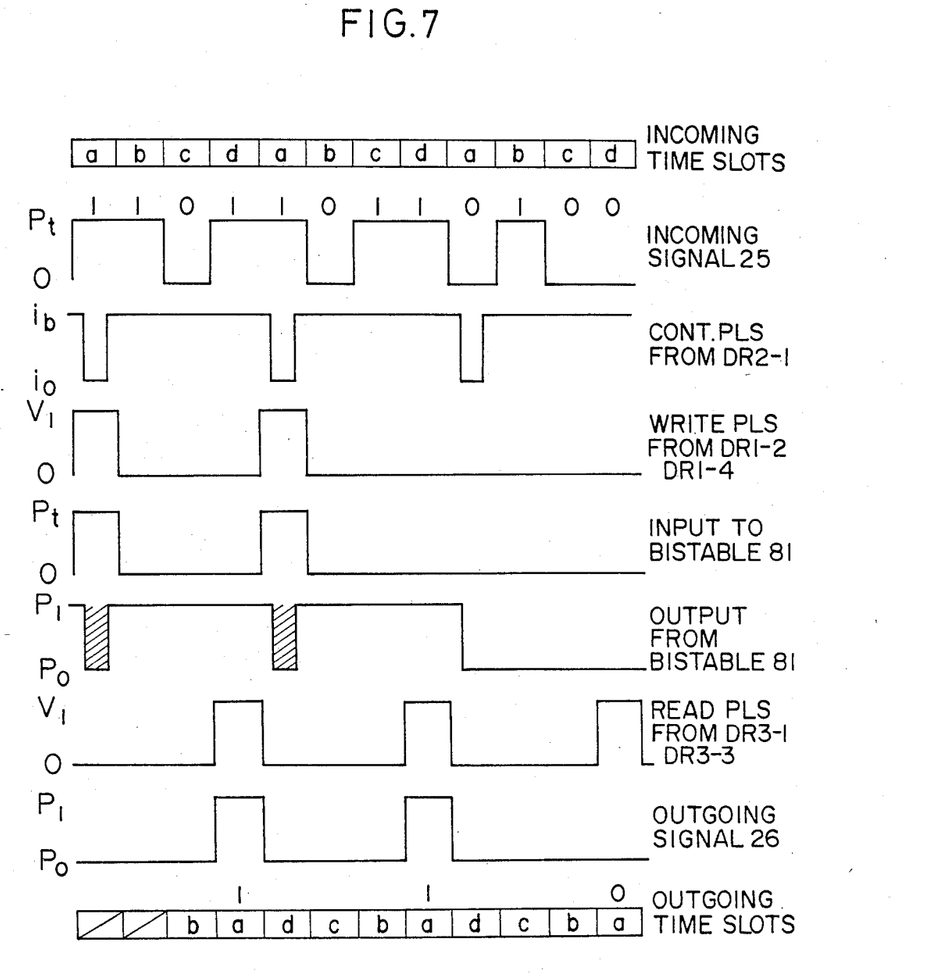

This method of operation is illustrated in FIG. 7 which differs from FIG. 6 in that the write pulse from the drivers DR1 has the duration of the time slot so that the optical input Pt to the bistable devices has the duration of the time slot and that the injection current $i_o$ is only required to occur within the period of the optical input Pt. The injection current drop from $i_b$ to $i_o$ thus causes the bistable device to assume an optical output value $P_2$ which is shown shaded in FIG. 7. However, the current rise to $i_b$ occurs in the presence of the optical input Pt to meet the set condition of the bistable device, allowing it to generate an optical output $P_1$. The reset condition of the truth table is met when the injection current drop occurs in the absence of optical input.

Figure 8:
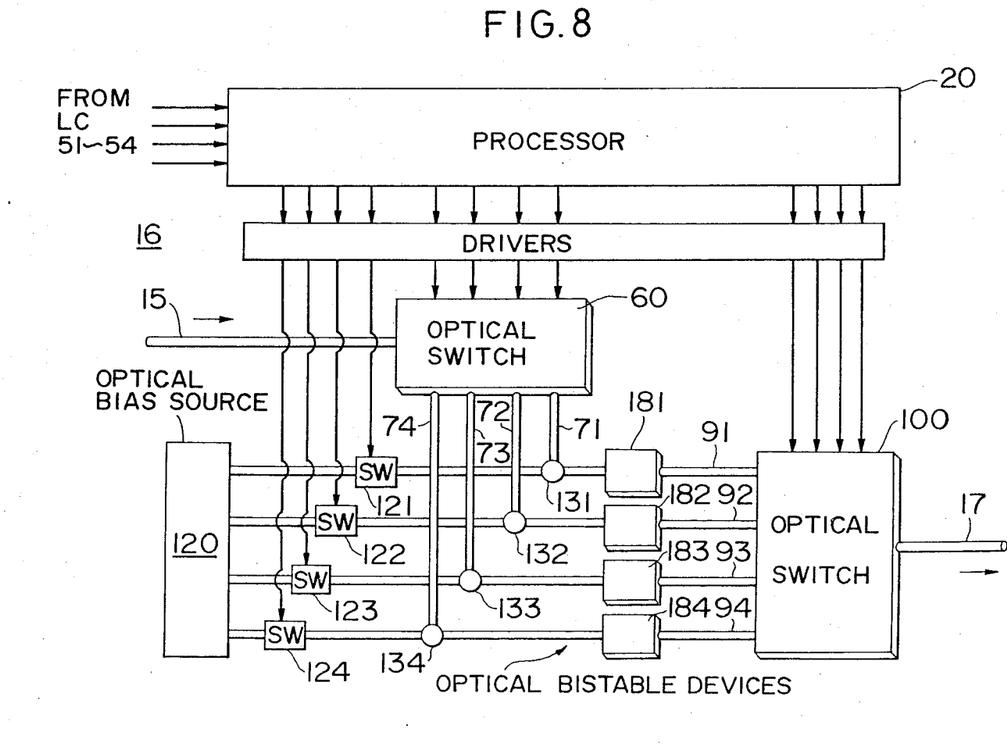
FIG. 8 is a diagrammatic view illustrating a second embodiment of the switching unit of FIG. 1 employing optical directional coupler circuit having a feedback loop as the bistable devices.

FIG. 8 is an illustration of a second embodiment of the switching network 16. This embodiment differs from the embodiment of FIG. 2 in that the injection-current controlled bistable lasers 81-84 are replaced with optical directional couplers 181-184 having closed loops. As will be described the directional couplers 181-184 exhibit bistability exclusively depending on the amount of light incident thereon. For this purpose, an optical bias source 120 is provided to supply bias light to optical switches 121-124 of a known switched directional coupler type which are controlled by drivers in response to instructions from the processor 20 and thence to optical couplers 131-134. The optical couplers 131-134 combine the bias light with the optical digital signals on waveguides 71-74 and the combined optical outputs are applied to the inputs of the bistable devices 181-184, respectively.

Figure 9:
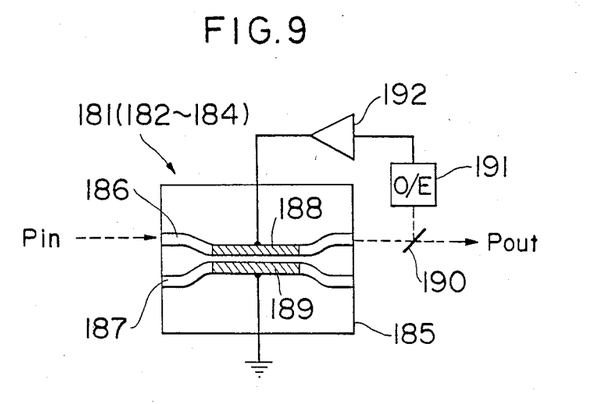
FIG. 9 is an illustration of the detail of the optical bistable device using a directional coupler of FIG. 8.

FIG. 9 is an illustration of the detail of each of the optical bistable devices 181-184. These optical bistable devices each comprise a $LiNbO_3$ substrate 185 on which is formed a pair of titanium-diffused optical waveguides 186 and 187 which are spaced far apart except at the location where switching occurs, at which point the waveguides are in close proximity. A pair of electrodes 188 and 189 are provided on those portions of the waveguides which are in close proximity to each other. The waveguide 186 has its input end optically coupled with an associated one of the waveguides 71-74 and has its output end optically coupled with a half-silvered mirror, or beam splitter 190 which reflects a portion of the incident light to an optoelectical converter 191 which in turn is coupled through an amplifier 192 to the electrode 188. The electrode 189 is grounded.

Figure 10:
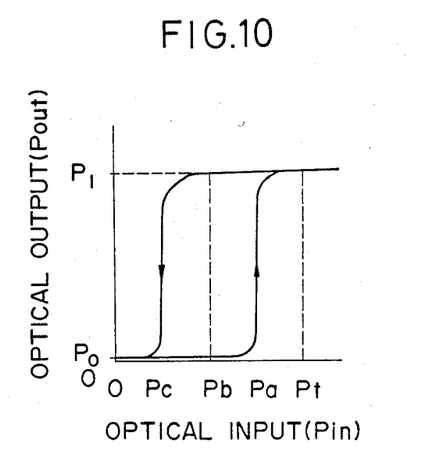
FIG. 10 is an illustration of the operating characteristic of the circuit of FIG. 9.

A feedback loop is thus formed which maintains the electrode 188 at a high potential as long as the optical input exceeds a higher threshold value Pa (FIG. 10) and switches the potential to a lower level when the optical input drops below a lower threshold level Pc. The beam splitter 190 passes the remainder of the incident light as an optical output of the bistable optical device to an associated one of the waveguides 91-94. The hysteresis characteristic shown in FIG. 10 is utilized to advantage by the optical bias which the optical input level of the bistable devices 181-184 at a point Pt above the higher threshold Pa to store a binary 1 in response to an optical information bit having a level (Pt - Pb).

The operation of the FIG. 8 embodiment is as follows. The optical switches 121-124 are selectively briefly switched off to block the bias light so that a selected one of the bistable devices 181-184 is cleared. Immediately following the clearing, an optical information bit having the level (Pt - Pb) is applied to the selected bistable device in the presence of the bias light Pb. The input optical level is raised to a level Pt which sufficient to generate an optical output $P_1$ which is held by the bias light which exists after the optical binary 1 ceases to exist, thus storing a binary 1 in the selected bistable device. When the optical input is a binary 0, the total amount of the optical input to the selected bistable device is Pb which is insufficient to generate an optical output $P_1$ and thus it remains at an output level $P_0$ signifying a binary 0.

Figure 11:
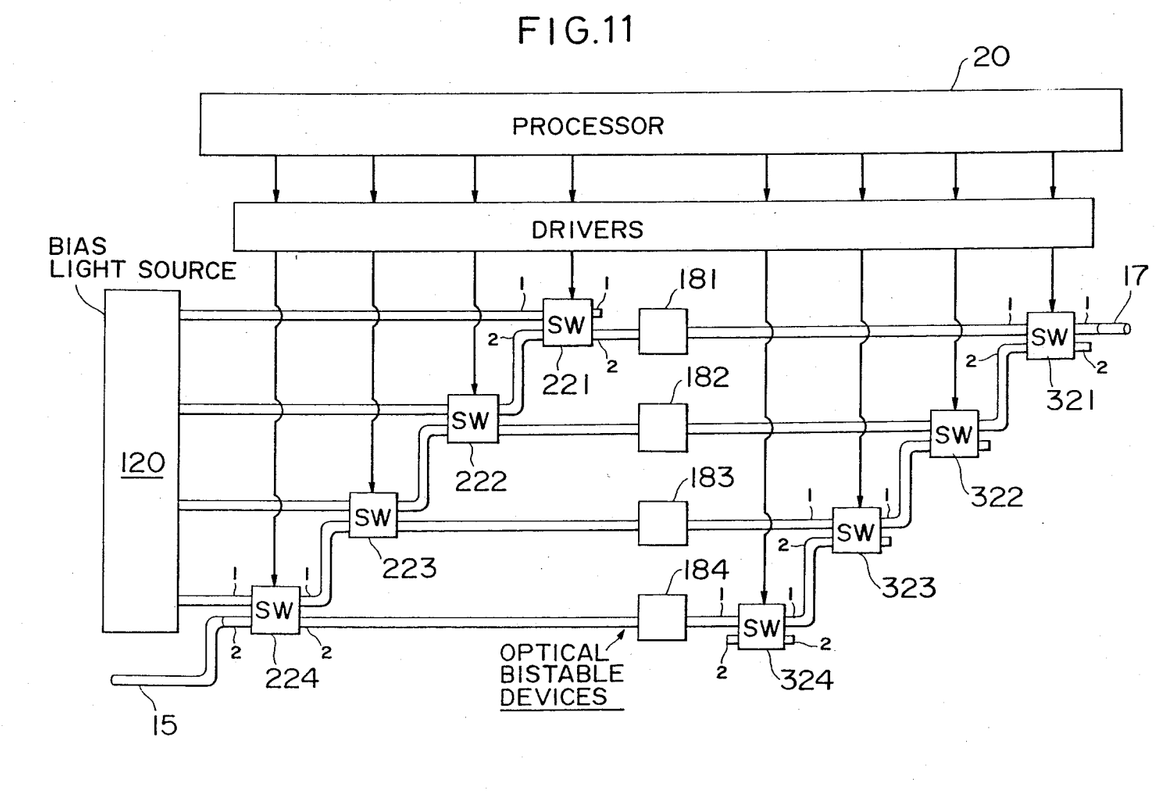
FIG. 11 is a modification of the embodiment of FIG. 8.

A modification of the embodiment of FIG. 8 is illustrated in FIG. 11. The modified embodiment differs from the FIG. 8 embodiment in that the optical switches 60, 121-124 are replaced with an array of write-in optical switches 221-224 of a known directional coupler type having two input ports and two output ports and the optical switch 100 is replaced with an array of readout optical switches 321-324 which are identical to switches 221-224.

Optical switches 221-224 have their first input ports coupled from the bias light source 120 and their second inputs coupled from the first output ports of other optical switches with the exception that switch 224 takes the information input from the waveguide 15 and the first output port of the switch 221 is left unconnected. The second ouput ports of the switches 221-224 are connected respectively to the bistable devices 181-184. Optical switches 321-324 have their first input ports coupled respectively from the outputs of the bistable devices 181-184 and their second input ports coupled from the first output port of the other switches and their second output ports are left unconnected.

In operation, write-in optical switches 221-224 are controlled by the processor 20 such that in the absence of a control potential V1 they cross-couple their first and second input ports to their second and first output ports, respectively, and in the presence of the control potential $V_1$ the first and second input ports are coupled to the first and second output ports, respectively. Thus, the optical information on waveguide 15 can be switched to the first output port of the next switch in response to the control voltage $V_1$ and the bias light is applied to the associated bistable device. Likewise, the absence of control voltage $V_1$ on readout switches 321-324 causes them to establish cross-coupling between their input and output ports and the presence of the control voltage causes them to pass the optical information at their first input port to pass to the second input port of the next readout switch.

The write-in switches 221-224 are normally impressed with the control voltage $V_1$ to pass the bias light to the bistable devices 181-184 and apply the optical information on incoming waveguide 15 through switches 224, 223, 222 and 221 to the open-end termination of the first output port of the switch 221. Likewise, the readout switches 331-334 are normally biased by the control voltage $V_1$ to pass the optical outputs of devices 181-184 to the open-end terminations of their second output ports.

This embodiment requires the optical information bit to have a level in excess of Pt to write in a binary 1.

Figure 12:
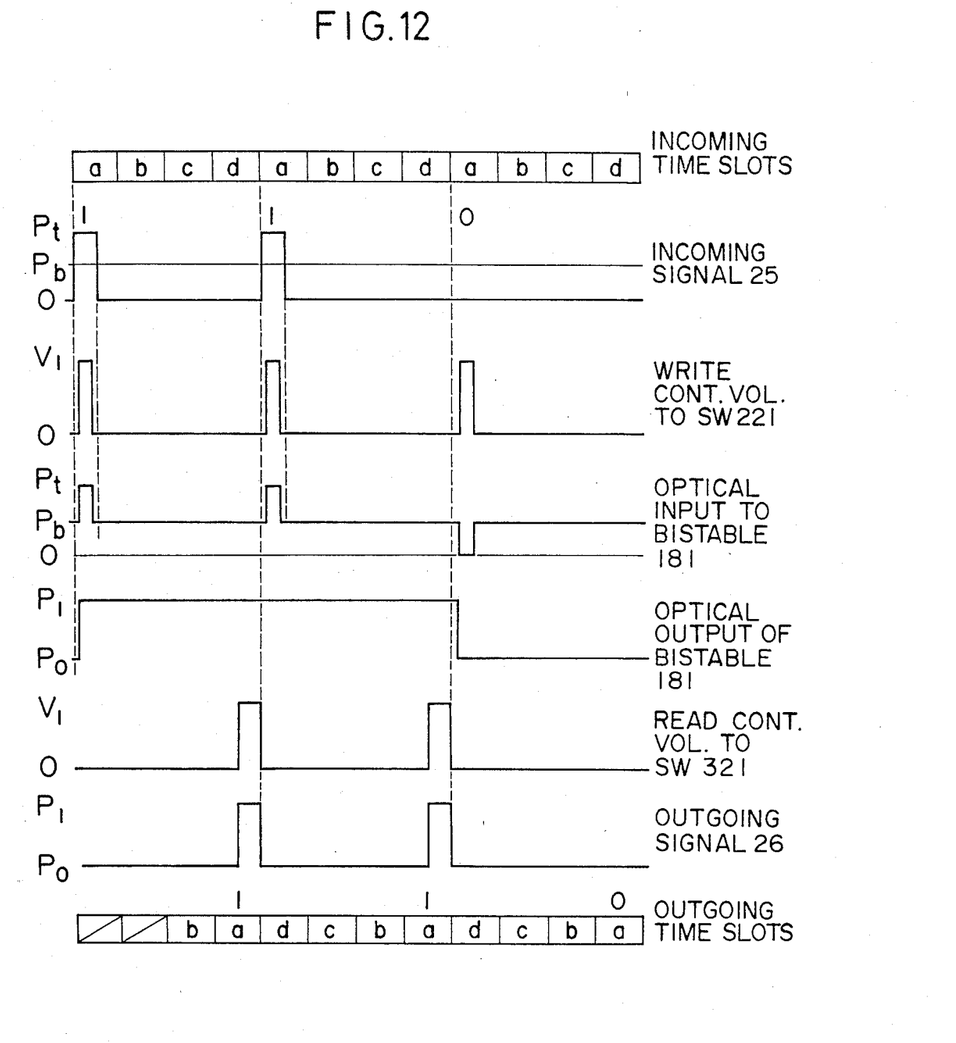
FIG. 12 is a timing diagram associated with the embodiment of FIG. 11.

The operation of the embodiment of FIG. 11 will best be understood with reference to FIG. 12. Normally, the control voltage $V_1$ is not applied to the write-in switches 221-224 to permit the bias light Pb to be injected to the bistable devices 181-184. When a control voltage $V_1$ is applied to the write-in switch 221 for a period smaller than the pulse duration of the optical signal 25 on waveguide 15 in synchronism with the #1 time slot of the incoming signal to which the station A is assigned, the bias light is disconnected from the bistable device 181, while the optical information on waveguide 15 is instead admitted thereto. If the signal 25 is a binary 1, the optical input level of the bistable device 181 is raised to Pt, causing it to switch to a higher optical output level $P_1$. The turn-off the control voltage $V_1$ allows the bias light to be reapplied to the bistable device 181, so that it maintains the high optical level output $P_1$ until a binary 0 occurs in the #1 time slot of the third frame.

The binary 0 is likewise written into the device 181 by briefly applying the control voltage $V_1$ to the switch 221 to reduce the optical input level to $P_0$. The removal of the control voltage from switch 221 after this brief period reapplies the bias light to the bistable device 181. However, the input level of device 181 is not sufficient to turn it to higher output level, so that its output remains at $P_0$ representing the binary 0.

Likewise, the control voltage $V_1$ is sequentially applied to switches 222 to 224 to write the optical bits of the #2 to #4 time slots into the bistable devices 182 to 184, respectively.

The optical binary 1 is read out of the device 181 in response to a readout control voltage $V_1$ applied to the switch 321 in synchronism with the #4 time slot of the outgoing signal to thereby establish a connection between stations A and D.

Figure 13:
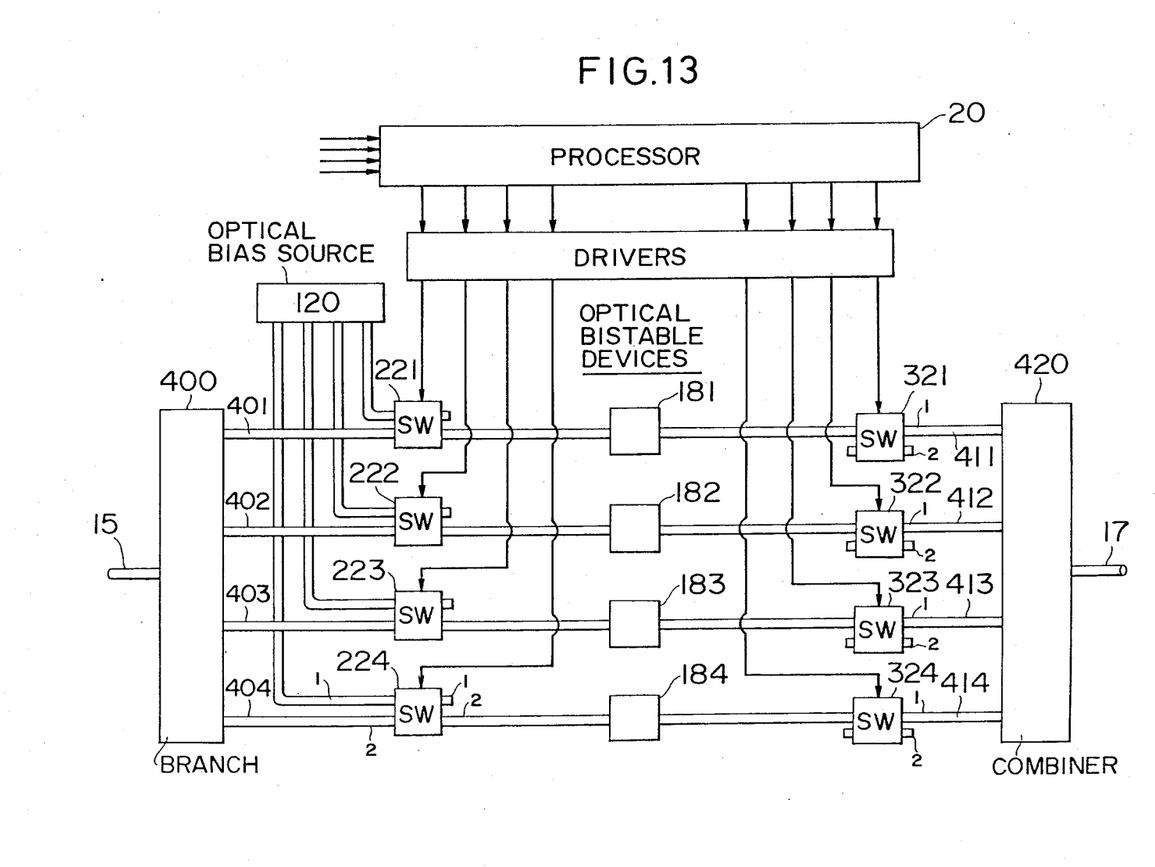
FIG. 13 is an illustration of a second modification of the second embodiment.

The FIG. 11 embodiment can be modified as shown in FIG. 13. In FIG. 13, the incoming common waveguide 15 is coupled to the input of an optical coupler 400 having its outputs coupled by way of waveguides 401-404 to the second input ports of the optical switches 221-224, respectively, and the outgoing common waveguide 17 is coupled from the first output ports of switches 321-324 by way of waveguides 411-414 and an optical coupler 420. The operation of the FIG. 13 embodiment is generally similar to that of the FIG. 11 embodiment with the exception that, since the incoming waveguides 401-404 are individually associated with write-in switches 221-224 and likewise the outgoing waveguides 411-414 are individually associated with readout switches 321-324, these switches can be exclusively controlled.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

For example, in the first embodiment, the write-in switch 60 may be controlled so that the calling station signals are stored in the bistable devices in the time slots of the called stations, rather than in the sequential order as described, and the readout switch 100 is operated in a sequential manner. This alteration applies to the other embodiments. Furthermore, more than one binary digit may be assigned to each time slot by the use of more than one optical bistable device for each time slot.

What is claimed is:

1. An optical switching system having control means for generating a switching instruction in response to a selection signal from a plurality of lines or trunks, means for multiplexing signals from said lines or trunks onto different time slots and applying the multiplexed signals to a common incoming optical medium, and means for demultiplexing said multiplexed signals from a common outgoing optical medium and applying the demultiplexed signals to said lines or trunks, said system comprising:

a plurality of optical bistable devices each having a hysteretic relationship between an optical input supplied thereto and an optical output delivered therefrom, each of said bistable devices being capable of assuming a high optical output state in response to the simultaneous presence of energy and an optical input supplied thereto and maintaining said high optical output state in the exclusive presence of said energy and capable of assuming a low optical output state in response to the simultaneous absence of said energy and said optical input;

first optical switching means responsive to said switching instruction for selectively switching said multiplexed signals from said common incoming optical medium to said optical bistable devices as said optical input to individually store said signals therein;

second optical switching means responsive to said switching instruction for selectively switching said stored signals from said optical bistable device to said outgoing optical medium; and means for coupling said energy from an external source to said bistable devices in response to said switching instruction to cuase said bistable devices to assume said high optical output state to store said signals and decoupling said energy from bistable devices in response to said switching instruction to cause said bistable devices to assume said low optical output state to erase said stored signals.

2. An optical switching system as claimed in claim 1, wherein each of said optical bistable devices is capable of assuming said high and low optical output states in response to the simultaneous presence of and the simultaneous absence of optical energy and said optical input, wherein said energy coupling means comprises means for coupling optical energy to said bistable devices.

3. An optical switching system as claimed in claim 1, wherein each of said optical bistable devices is capable of assuming said high and low optical output states in response to the simultaneous presence of and the simultaneous absence of electrical energy and said optical input, wherein said energy coupling means comprises means for coupling electrical energy to said bistable device.

4. An optical switching system as claimed in claim 1, wherein each of said optical bistable devices comprises:
   a substrate,
   a pair of first and second optical waveguides provided on said substrate in energy transfer relationship therebetween under the influence of an electric field, said waveguides being spaced far apart except at the location where the waveguides are in close proximity to each other to store energy therebetween, said first and second waveguides being provided with first and second electrodes respectively, and
   a feedback circuit for applying an optical output of said first waveguide to said first electrode, the first optical waveguide being optically coupled with said first optical switching means at an input end thereof and with said second optical switching means at an output end, wherein said first switching means includes:
   optical biasing means including a bias light source connected to input ends of the first waveguides of said optical bistable devices for supplying an optical bias to each optical bistable device.

5. An optical switching system as claimed in claim 4, wherein said first optical switching means comprises a plurality of optical switches each having a pair of first and second input ports and a pair of first and second output ports connected respectively to said first and second input ports or respectively to said second and first input ports in response to said switching instruction from said control means, said first input port of each optical switch being optically connected to said bias light source, the second input port of one of said optical switches being connected to said common imcoming optical medium, the second inputs of the other optical devices being respectively connected to the first output ports of another optical switch, the second output port of each optical switch being connected to the input end of the first waveguide of a respective one of said optical bistable devices.

6. An optical switching system as claimed in claim 4, wherein said first optical switching means comprises a plurality of optical switches each having a pair of first and second input ports and an output port selectively connected to said first or second input port in response to said switching instruction from said control means, said first input port of each optical switch being optically connected to said bias light source, the second input ports of said optical switches being connected to said common incoming optical medium, the output port of each optical switch being connected to the input end of the first waveguide of a respective one of said optical bistable devices.

* * * * *